United States Patent [19]

Norman et al.

[11] 4,130,224
[45] Dec. 19, 1978

[54] VISCOUS LIQUID DISPENSER

[75] Inventors: Richard O. Norman; John R. Frassanito, both of San Antonio, Tex.

[73] Assignee: Envair, Inc., San Antonio, Tex.

[21] Appl. No.: 730,834

[22] Filed: Oct. 8, 1976

[51] Int. Cl.² .............................................. G01F 11/02
[52] U.S. Cl. .................................. 222/185; 222/207; 222/214; 222/282
[58] Field of Search ............... 222/214, 207, 103, 185, 222/282

[56] References Cited

U.S. PATENT DOCUMENTS

| | | | |
|---|---|---|---|
| 1,392,601 | 10/1921 | Rose | 222/214 X |
| 2,950,030 | 8/1960 | McConnohie | 222/207 X |
| 3,066,832 | 12/1962 | Rossetti | 222/214 X |
| 3,741,439 | 6/1973 | Vehrs | 222/103 |
| 3,870,201 | 3/1975 | Asplund | 222/214 X |

FOREIGN PATENT DOCUMENTS 360773  4/1962  Switzerland ........................... 222/214

Primary Examiner—Robert B. Reeves
Assistant Examiner—Frederick R. Handren

[57] ABSTRACT

A viscous liquid dispenser is characterized by a yieldable lever arm pivotally connected within a casing. The lever arm carries a rigid dispensing block thereon. In response to the imposition of an actuating force to the lever arm, the arm pivots to bring the tip of the dispensing block into contact with a resilient flexible tube extending from a viscous liquid reservoir. The resilient tube is constricted between the tip of the dispensing block and a predetermined impact point located on a movable back-up block provided adjacent to the resilient tube and opposite from the dispensing block. The lever arm yieldably responds to the continued application of an actuating force to compress a portion of the resilient tube immediately below the constriction between the dispensing block and a predetermined dispensing surface disposed on the back-up block. The compressive force thereby imparted to the entrapped viscous liquid unseats a spring-biased long-throw ball check valve and to expel a predetermined quantity of viscous liquid from the resilient tube. Upon cessation of the actuating force, the yieldable lever arm and the resilient tube return to their unstressed states, and the ball check valve returns to its seat, the suction created thereby draws any remaining viscous liquid back into the lower portion of the resilient tube. The magnitude of the volume of viscous liquid dispensed by each actuation of the yieldable lever arm is able to be regulated by moving the back-up block with respect to the dispensing block.

1 Claim, 6 Drawing Figures

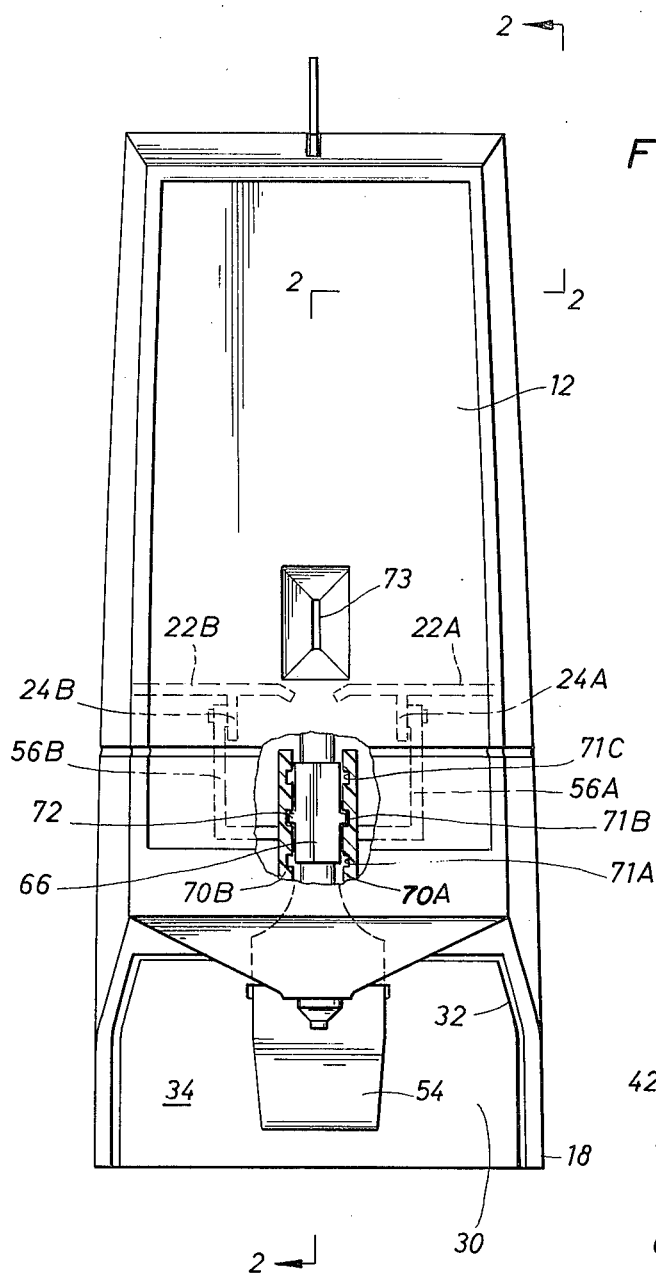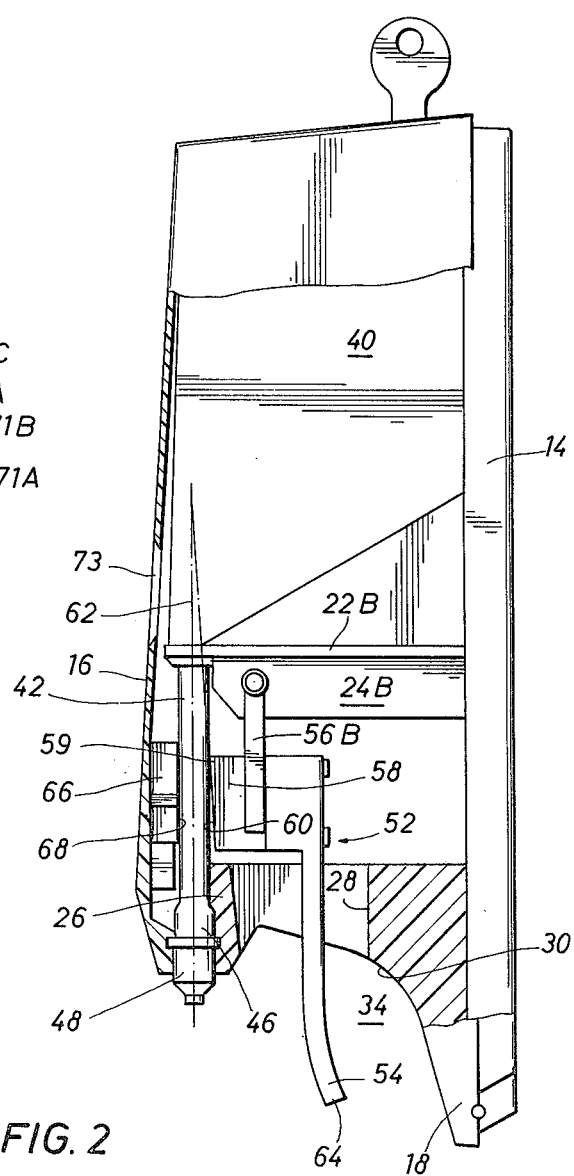
FIG. 1
FIG. 2

VISCOUS LIQUID DISPENSER

BACKGROUND OF THE INVENTION

1. Field of the Invention

This invention relates to viscous liquid dispensers, and, in particular, to a viscous liquid dispenser having a yieldable dispensing lever arm and arrangement for varying the volume of viscous liquid expelled.

2. Description of the Prior Art

Devices for the dispensing of a viscous liquid or paste-like product are known in the art. These devices may, for example, use a roller moving over a resilient tube that is connected to a viscous liquid reservoir to expel viscous liquid from the tube. As the roller advances, the resilient tube is progressively compressed between the roller and a suitably disposed back-up block. Examples of such prior art devices are U.S. Pat. No. 2,113,002, issued to Hefti, and U.S. Pat. No. 3,006,832, issued to Rosetti.

Alternatively, other prior art dispensing devices may utilize contact members which are first moved to constrict a portion of a resilient tube. Then, the contact member is forced into compressive contact with the resilient tube to cause viscous liquid to be expelled therefrom. Examples of the latter type viscous liquid dispenser are U.S. Pat. No. 3,741,439, issued to Vehrs, and U.S. Pat. No. 3,870,201, issued to Asplund. It is usually a problem of prior art devices of any type to have an unsightly and unsanitary coagulated mass of viscous liquid remaining at the orifice of the resilient tube left from previous dispensations of viscous liquid therefrom.

Both of the last-mentioned patents provide a contact member which is brought into compressive contact with a resilient tube extending from a viscous liquid reservoir to expell viscous liquid from the resilient tube. However, neither of these last-mentioned patents provide any mode of controlling the volume of liquid expelled during the actuation stroke of the apparatus. Also, neither of the last mentioned patents utilize a resiliently yieldable actuating lever arm to bring the compressing member into compressive contact with the resilient tube. Yet further, neither of these last-mentioned patents disclose suction means for drawing excess viscous liquid back into the resilient tube to prevent the coagulation of excess viscous liquid.

It would be advantageous to provide a viscous liquid dispensing apparatus having a suitable mechanism provided therein for varying the magnitude of viscous liquid expelled during the actuation stroke thereof. It would be of further advantage to provide a viscous liquid dispensing device utilizing a yieldable dispensing lever arm, actuation of which initially contacts a portion of a rigid dispensing block into constricting contact with the resilient tube and further actuation thereof causes yieldable deformation of the lever arm to compress a portion of the resilient tube below the constriction between the dispensing block and a compression surface on an oppositely disposed back-up block.

It is advantageous to provide a viscous liquid dispensing device including suitable suction means for drawing excess viscous liquid into the resilient tube to thereby prevent the unsightly and unsanitary coagulation of viscous liquid common in prior art dispensing apparatus. Thus, it is of further advantage to provide suction means in the form of a long-throw ball check valve such that cessation of an actuating force on the yieldable dispensing lever arm permits a spring bias element to overcome compressive forces within the viscous liquid to urge the ball to the closed position and to generate a suction force to draw viscous liquid into the downstream terminus of the resilient tube and thereby prevent dripping and coagulation of the viscous liquid product.

SUMMARY OF THE INVENTION

This invention relates to a viscous liquid dispensing apparatus having a viscous liquid reservoir suitably mounted within an appropriate housing or casing with a resilient tube attached thereto. Pivotally disposed within that casing is a yieldable lever actuating arm having a substantially rigid dispensing block mounted thereon. Movably disposed within the casing so as to bracket the resilient tube and oppositely face the dispensing block is a back-up block fabricated of a suitable, substantially rigid material. The yieldable lever arm responds to the imposition of an actuating force thereon by pivoting to bring the tip of the dispensing block into contact with a portion of the resilient tube to constrict the resilient tube between the dispensing block and the back up block and entrap a predetermined volume of viscous liquid downstream of the constriction. Continued application of an actuating force generates a rocking motion of the yieldable lever arm as the yieldable lever arm is deformed to bring the dispensing block into contact with the resilient tube and to compress a portion of the resilient tube immediately downstream of the constriction between the dispensing block and a compression surface disposed on the back-up block. Imposition of a compressive force on the entrapped viscous liquid by the cooperative action of the dispensing block and the back-up block overcomes the bias force of a spring bias element normally holding a long-throw ball check valve in the seated position. The long-throw ball check valve responds to the compressive force of the viscous liquid to unseat and thereby permit a predetermined volume of viscous liquid to be expelled from the downstream orifice of the resilient tube.

Upon release of the actuating force, the yieldable lever arm is restored to its undeformed condition and the resilient tube returns to its natural condition to open the constriction and to draw another charge of viscous liquid from the reservoir into the resilient tube. Simultaneously, cessation of the actuating force permits the spring bias to overcome the compressive force within the viscous liquid to urge the long-throw ball check valve toward the seated position. Return of the long-throw ball check valve to the seated position generates a suction force which draws any viscous liquid present at the orifice of the resilient tube into the lower end of the tube to prevent unsightly accumulation and coagulation of the viscous liquid.

BRIEF DESCRIPTION OF THE DRAWINGS

The invention will be more fully understood from the following detailed description of the preferred embodiment thereof, taken in connection with the accompanying drawings, in which:

FIG. 1 is a front elevational view, partially in section, of a viscous liquid dispensing device embodying the teachings of the invention;

FIG. 2 is a section view taken along line 2—2 of FIG. 1; and

DESCRIPTION OF THE PREFERRED EMBODIMENT

Figure 3:
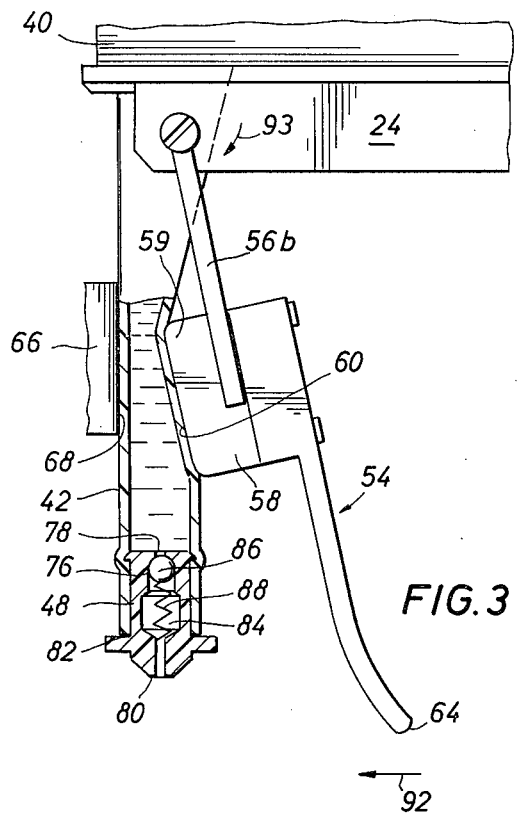
FIGS. 3 through 6 are sectional views, taken substantially along the same line 2—2 of a viscous liquid dispensing device embodying the teachings of this invention and illustrating the mode of operation thereof.

Throughout the following descriptions, similar reference numerals refer to similar elements in all figures of the drawings.

Referring to FIGS. 1 and 2, a plan and sectional view of the viscous liquid dispensing device are shown embodying the teachings of this invention, the dispensing device being generally indicated by reference numeral 10. The viscous liquid dispensing device 10 generally includes a casing 12 having a back cover 14 of generally rectangular shape and a correspondingly shaped front cover 16. The front cover 16 has extending arms 18 which are pivotally connected to the lower portion of the back cover 14 to permit the front cover 16 to swing away therefrom. Suitable locking means 20 are provided to expedite the opening and closing of the dispensing device casing 12, the locking means 20 being any suitable key lock device or the like.

The back cover 14 has first and second ledges 22A and 22B extending inwardly and substantially perpendicularly to the lengthwise dimension thereof. The ledges 22 are supported by perpendicularly extending support girders 24A and 24B. Disposed a predetermined distance below the ledges 22, a partition 26, having a circular recess 28 therein, is provided. The curved underside 30 of the partition 26 slopes toward the back cover 14 and defines a region 34 into which an operator's hand or force actuator may be inserted.

A suitable viscous liquid reservoir 40 of any predetermined shape (although conveniently shown to be substantially rectangular in volume so as to be received within the casing 12) is provided and rests upon the ledges 22A and 22B within the casing 12. A resilient tube 42, fabricated from a suitable material such as neoprene rubber, although it is understood that any other suitable material may be used, is connected with its first end in fluid communication with the reservoir 42. The tube 42 extends axially through the interior of the casing 12 between the ledges 22 and the circular recess 28. The resilient tube 42 terminates in a second, downstream end 46, the end 46 being disposed just beneath the lower end of the circular recess 28 in the partition 26. Provided in the second end 46 of the resilient tube 42 is an anti-drip, long-throw, ball-check valve 48, which is described in more detail herein.

As seen in FIGS. 1 and 2, an actuating lever arrangement generally indicated at 52 is provided. The lever arrangement 52 includes an extending dispensing arm 54 fabricated of a suitable yieldable material such as nylon, although other suitably flexible materials may be used. The lever arm 54 is supported for movement within the casing 12 by first and second struts 56A and 56B, respectively, the struts 56 being pivotally mounted to the support girders 24 of the ledges 22A and 22B. As seen, the dispensing lever arm 54 carries a substantially rigid, non-resilient, dispensing block 58, the dispensing block 58 being located within the casing and occupying a portion of the space between the lower surface of the ledges 22 and the upper surface of the partition 26. The dispensing block 58 has a tip 59 provided thereon for a purpose which will be made clear herein. In the normal, non-dispensing position illustrated in FIGS. 1 and 2, the dispensing block 58 is canted so that the substantially flat dispensing surface 60 thereon is inclined with an axis 62 extending in the downstream direction through the resilient tube 42. The free end 64 of the yieldable extending dispensing arm 54 of the lever arrangement 52 is disposed within the region 34 and is accessible to receive an operator's fingers or to receive an actuating force imparted thereto.

Movably mounted on the interior surface of the front cover 16 of the casing 12 is a substantially rigid, non-resilient, back-up block 66. In the assembled relationship illustrated in FIGS. 1 and 2, the back-up block 66 is disposed to occupy a portion of the volume between the lower surface of the ledges 22 and the upper surface of the partition 26 and has a transverse width of sufficient magnitude to encompass the transverse width of the resilient tube 42. When assembled, the back-up block 66 is located opposite from the dispensing block 58 and presents a compression surface 68 facing the dispensing surface 60 of the dispensing block 58. As is made more clear herein, the cooperative association of the dispensing surface 60 and a predetermined portion of the compression surface 68 compresses the resilient tube 42 therebetween (upon activation of the lever arrangement 52) to cause a measured amount of viscous liquid to be expelled from the second end 46 of the resilient tube 42. Movement of the back up block 66 within the casing 12 has the effect of varying the magnitude of the compression surface 68 on the back up block 66 that cooperates with the dispensing surface 60 on the dispensing block 58 to thereby vary the amount of viscous liquid expelled at each operation of the lever arrangement 52.

Means are provided to permit relocating movement of the back-up block 66 within the casing 12. As an example, the interior of the front cover 16 is provided within runners 70A and 70B. The runners have a plurality of sets of slots 71A–71C therein which receive flanges 72 disposed on the back-up block 66. By inserting the flanges 72 into a predetermined one of the sets of slots 71, the degree of cooperative association between the dispensing surface 60 on the dispensing block 58 and the compression surface 68 on the back-up block 66 may be varied, to variably control the amount of viscous liquid expelled. Of course, it is understood that any suitable method of varying the location of the back-up block 66 with respect to the casing 12 and with respect to the dispensing block 58 is within the contemplation of this invention.

The front cover 16 may conveniently be provided with a port 73 which permits an outside observer to monitor the progressive decrease in level of viscous liquid within the reservoir 40 as the device 10 is operated. When the level of viscous liquid within the reservoir 40 indicates that a refill is required, the locking means 20 may be actuated to permit the front cover 16 to pivot away from the back cover 14 to provide access to the reservoir 40. The reservoir 40 may have an opening provided therein to permit refilling thereof, or, in the alternative, a unitized viscous liquid reservoir, complete with an integral resilient tube 42, may be provided for simple and efficient insertion onto the ledges 22 within the casing 12. While the interior of the front cover 16 is thus exposed, any necessary or desired adjustments to the movable back-up block 66 may be effected. Closure of the locking means 20 again provides an integral housing for the reservoir 40.

Referring now to FIGS. 3 through 6, sectional views of the dispensing device 10 embodying the teachings of this invention are shown which diagrammatically illustrate the principles of operation thereof.

However, before discussing the operative mode of a dispensing device 10 embodying the teachings of this invention, attention is directed to FIG. 3 to the second, downstream, end 46 of the resilient tube 40, wherein the long-throw ball-check valve 48 is suitably mounted. The ball-check valve 48 includes an elongated valve housing 76 having a first inlet orifice 78 and a second, downstream, or outlet, orifice 80. An elongated valve chamber 82 has a distended portion 84 which creates a holding space on the interior of the housing 76. A ball element 86 is biased toward the closed, or seated, position, illustrated in FIG. 3, by a biasing element, such as a coil spring 88, mounted on a spring retainer adjacent the outlet orifice 80.

The apparatus 10 embodying the teachings of this invention, while in the normally unactuated state shown in FIG. 2, is arranged such that viscous liquid from the reservoir 40 is drained by force of gravity into the resilient tube 42 and completely fills the volume of the tube up to and including the point in the resilient tube immediately upstream of the ball-check valve 48. In operation, actuation of the extending arm 54 of the lever 52 in a direction indicated by arrow 92, in FIGS. 3 through 5, causes the lever arrangement 52, and particularly the yieldable extending dispensing arm 54 thereof, to pivot in the direction of arrow 93 about the attachment between the struts 56 and the girders 24 to move the tip 59 of the dispensing block 58 into contact with the exterior of the resilient tube 42.

Figure 4:
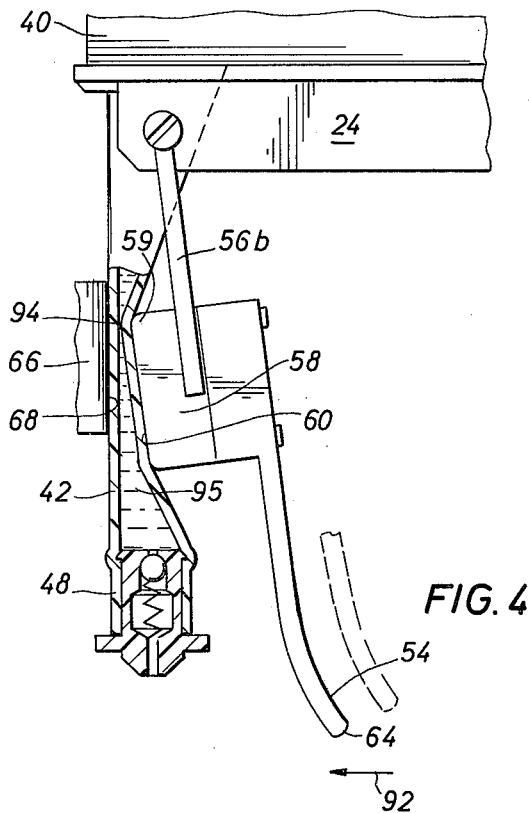

As seen in FIG. 4, when the yieldable extending arm 54 has pivotally moved from its initial position (shown in dot-dash lines) to the position shown in solid lines, the resilient tube 42 is constricted between the tip 59 of the dispensing block 58 and a predetermined impact point 94 disposed on the compression surface 68 of the back-up block 66. It is appreciated that both the magnitude of the compression surface 68 on the back-up block 66 and the location of the impact point 94 on the compression surface 68 vary depending upon the location of the back-up 66 with respect to the casing 12.

Figure 5:
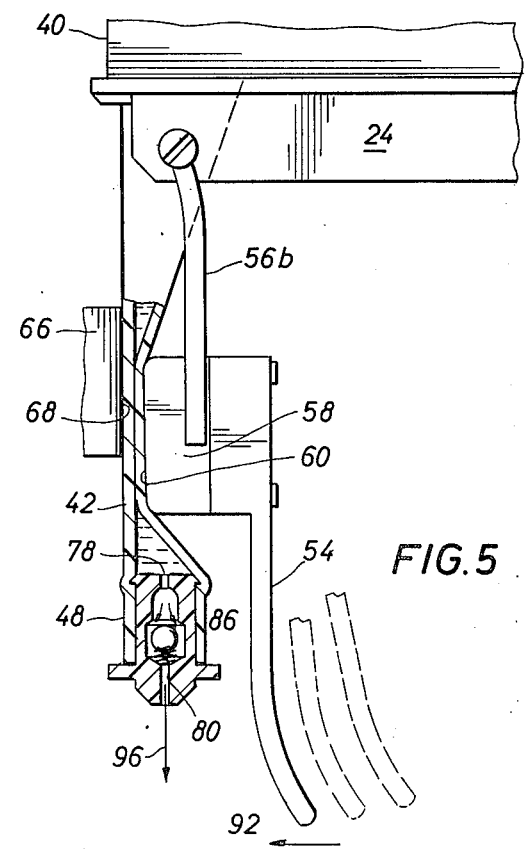

Constriction of the resilient tube between the tip 59 of the dispensing block 58 and the impact point 94 on the compression surface 68 of the back-up block 66 entraps a predetermined volume 95 of viscous liquid downstream of the constriction within the resilient tube 42. As seen in FIG. 5, continued application of the actuating force in the direction indicated by arrow 92 causes the yieldable extending arm 54 to deform in response thereto and generate a "rocking" action about the constriction point to bring the dispensing surface 60 of the dispensing block 58 into contact with a predetermined portion of the exterior of the resilient tube 42. Continued application of the actuating force thereby causes compressive contact to be generated on the exterior of the resilient tube 42 downstream of the impact point 94 between a portion of the dispensing surface 60 on the dispensing block 58 on one side of the tube 42 and a predetermined portion of the compression surface 68 provided on the back-up block 66 on the opposite side of the tube 42. The portion of the compression surface 68 in contact with the tube 42 is, of course, controlled by the location of the back-up block 66 within the casing 12. It may be appreciated that the magnitude of the overlap of the surfaces 60 and 68 between which the exterior of the resilient tube 42 is compressed is functionally related to, and regulates, the magnitude of compressive force imposed upon the entrapped viscous liquid 95 within the resilient tube 42 downstream of the constriction.

As seen in FIG. 5, imposition of a compressive force on the entrapped viscous liquid overcomes the spring bias imposed on the ball element 86 to move the ball element from its seated position about the inlet orifice 78 and to permit viscous liquid to flow therethrough. The viscous liquid flows into the holding space 84 and through the outlet orifice 80, as indicated by the arrow 96, to expel a predetermined, measured, volume of viscous liquid from the resilient tube 42.

Figure 6:
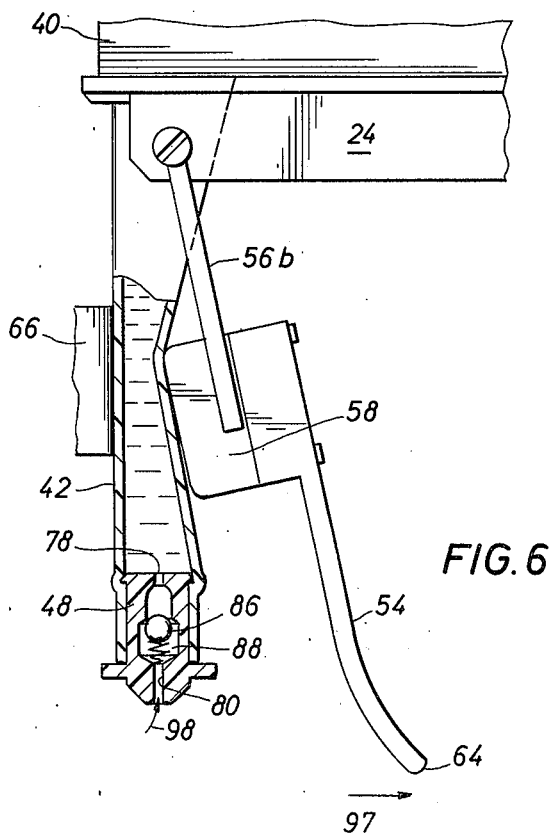

Referring to FIG. 6, cessation of the actuating force on the yieldable extending arm 54 permits the arm 54 to rock back and return to its normal, non-deformed position, as indicated by the arrow 97, and to cease the generation of the compressive force on the viscous liquid within the resilient tube 42. Therefore, the force of the spring bias 88 becomes dominant and forcefully throws the ball element 86 against its seat about the inlet orifice 78. Further, as the resilient tube 42 assumes its non-deformed state, the lever arrangement 52 is further impelled to its initial position (FIG. 2).

It may be appreciated by those skilled in the art that the rapid return of the ball element 86 to its seat adjacent the inlet orifice 78 within the valve housing 76 generates a suction force which draws any viscous liquid that remains within the outlet orifice 80 or immediately adjacent the exterior thereof into the distended volume 84 disposed within the valve housing 76, as indicated by the arrow 98. Therefore, unsightly and unsanitary coagulation and accumulation of viscous liquid about the exterior of the dispensing valve, which usually plagues prior art dispensing devices, is effectively prohibited by a dispensing device embodying teachings of this invention. It may further be appreciated that the utilization of a yieldable material to fabricate the extending arm 54 replaces and overcomes the need for any mechanical biasing elements to return the actuating arm to its initial position.

It may also be appreciated that an apparatus embodying the teachings of this invention provides an adjustable control for regulating the magnitude and volume of viscous liquid expelled from the resilient tube 42. By orienting and displacing the back-up block 66 with respect to the front cover 16, the location of the impact point 94 and the magnitude of the compression surface 68 on the back-up block 66 is varied. Thus, when the compression surface 68 on the back-up block 66 cooperates with the dispensing surface 60 on the dispensing block 58 to firstly constrict the tube 42 and secondly to impose a compressive force on the entrapped viscous liquid therein, the magnitude of the force imposed upon the entrapped viscous liquid is functionally dependent upon the magnitudes of the cooperating surfaces. Therefore, by varying the location of the back-up block 66 within the casing 12, more or less compressive force is imposed upon entrapped viscous liquid and accordingly, a greater or lesser volume of viscous liquid is expelled through the ball-check valve 48. It is also appreciated by those skilled in this art that a viscous liquid dispensing device embodying the teachings of this invention is operable to prevent unsightly dripping and coagulation of viscous liquid through the means suction force generated by the long-throw ball-check valve as that valve reseats itself at the termination of a dispensing stroke.

What is claimed is:

1. Apparatus for dispensing a viscous liquid comprising:
   a casing;
   a viscous liquid reservoir disposed within said casing;
   a resilient tube attached at a first end thereof to said reservoir;
   a rigid backup block having a compression surface thereon adjustably disposed within said casing adjacent to said resilient tube, said block being adjustable to regulate the volume of viscous liquid dispensed;
   a yieldable dispensing arm pivotally connected at a first end thereof and having a second, free end thereon;
   a rigid dispensing block having a tip thereon mounted on said yieldable dispensing arm; said dispensing arm being responsive to an actuating force imposed at said free end thereof to pivotally move to constrict said resilient tube between the tip of said dispensing block and a predetermined impact point on said backup block; said dispensing arm being yieldably responsive to an actuating force to compress a predetermined portion of said resilient tube between said dispensing block and a predetermined portion of said compression surface on said backup block to expell a volume of liquid from within the resilient tube; and
   a spring biased, long throw, check valve disposed within said resilient tube at a second end thereof for drawing liquid into said resilient tube in response to the cessation of an actuating force to said lever.

* * * * *